(12) United States Patent
Hill et al.

(10) Patent No.: US 10,479,334 B2
(45) Date of Patent: Nov. 19, 2019

(54) METHOD TO AUTOMATICALLY ADJUST A TRAILER BRAKE CONTROLLER

(71) Applicant: Ford Global Technologies, LLC, Dearborn, MI (US)

(72) Inventors: Thaddeus Hill, Livonia, MI (US); Joe Alexander Bousamra, Commerce Township, MI (US); Lawrence Robert Rhein, China, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/603,995

(22) Filed: May 24, 2017

(65) Prior Publication Data

US 2018/0339685 A1   Nov. 29, 2018

(51) Int. Cl.
| | |
|---|---|
| B60T 8/17 | (2006.01) |
| B60T 8/176 | (2006.01) |
| B60T 8/172 | (2006.01) |
| B60T 7/20 | (2006.01) |
| B60T 8/32 | (2006.01) |
| B60T 7/04 | (2006.01) |

(52) U.S. Cl.
CPC ............ *B60T 8/1708* (2013.01); *B60T 7/042* (2013.01); *B60T 7/20* (2013.01); *B60T 8/172* (2013.01); *B60T 8/176* (2013.01); *B60T 8/321* (2013.01)

(58) Field of Classification Search
CPC ............................. B60T 8/1708; B60T 7/042
See application file for complete search history.

(56) References Cited

U.S. PATENT DOCUMENTS

| | | | |
|---|---|---|---|
| 3,909,075 A | | 9/1975 | Pittet, Jr. et al. |
| 4,140,352 A | * | 2/1979 | Delpech ............... B64C 25/426 244/111 |
| 4,324,320 A | * | 4/1982 | Spurlin ................ B60T 13/585 188/271 |
| 5,438,516 A | * | 8/1995 | Neubauer ................ B60T 7/20 303/7 |
| 8,511,759 B2 | | 8/2013 | Marsden et al. |
| 8,789,896 B2 | | 7/2014 | Albright et al. |
| 9,026,311 B1 | * | 5/2015 | Pieronek ............... B60W 10/18 280/455.1 |
| 9,031,754 B2 | | 5/2015 | Matoy et al. |
| 2003/0168908 A1 | * | 9/2003 | Robinson ................ B60T 7/10 303/7 |
| 2006/0173584 A1 | * | 8/2006 | Einig .................... B60T 8/1708 701/1 |

(Continued)

FOREIGN PATENT DOCUMENTS

| | | |
|---|---|---|
| EP | 0697314 B1 | 3/2000 |
| EP | 2199166 A1 | 6/2010 |
| GB | 2282424 B | 9/1995 |

*Primary Examiner* — Alex C Dunn
(74) *Attorney, Agent, or Firm* — Raymond Coppiellie; Price Heneveld LLP

(57) ABSTRACT

A vehicle brake system includes a brake control device, a vehicle acceleration sensor, and a trailer brake controller. The trailer brake controller outputs an initial trailer brake torque demand based on an input received from the brake control device and adjusts the initial trailer brake torque demand to converge a signal from the vehicle acceleration sensor to an expected negative acceleration value correlated with the input from the brake control device.

20 Claims, 6 Drawing Sheets

(56) References Cited

U.S. PATENT DOCUMENTS

| | | | |
|---|---|---|---|
| 2007/0001509 A1* | 1/2007 | Brown | B60K 35/00 |
| | | | 303/123 |
| 2007/0024107 A1* | 2/2007 | Marsden | B60K 35/00 |
| | | | 303/7 |
| 2012/0041659 A1* | 2/2012 | Greene | B60D 1/30 |
| | | | 701/70 |
| 2015/0353063 A1 | 12/2015 | Tuhro et al. | |
| 2016/0137174 A1* | 5/2016 | Valenzano | B60T 8/1708 |
| | | | 701/70 |
| 2016/0297411 A1* | 10/2016 | Trombley | B60T 8/1708 |
| 2017/0151935 A1* | 6/2017 | Prohaszka | B60T 8/1708 |

* cited by examiner

METHOD TO AUTOMATICALLY ADJUST A TRAILER BRAKE CONTROLLER

FIELD OF THE DISCLOSURE

The present disclosure generally relates to a system for control of trailer brakes by a towing vehicle. In particular, the system adjusts a control signal for the trailer brakes to achieve an expected deceleration rate of the vehicle-trailer combination.

BACKGROUND OF THE DISCLOSURE

Control systems have been used within vehicles to control trailer brakes. Such systems generally activate in a manner correlated with actuation of the vehicle brakes to augment the braking force of the vehicle itself, which may be necessary or useful for towing larger or heavier trailers. Known systems provide a control signal for a coupled trailer brake system that is constantly proportional to the torque demand of the vehicle brakes (i.e. the position of the vehicle brake pedal), regardless of the actual braking effect achieved by the controlled actuation of the trailer brakes. While such systems may provide for adjustment of a gain applied to the brake torque demand signal to achieve the output trailer brake control signal, this gain adjustment is not responsive enough for a user to make adjustments during extended driving over varying speeds. Rather, such gain control is intended to be used upon a change in trailer load (either by removing payload or changing the trailer) before engaging in extended driving. As such, a test actuation input is also provided that can allow the user to test the result of the trailer brake control signal output at a current gain level to determine if the resulting brake application is too low (resulting in too low a brake torque being applied) or too high (which may result in locking of the trailer wheels due to excessive brake torque). Accordingly, a user can add or remove gain according to the test results. In some instances, a user may forget to adjust gain when needed, resulting in extended driving with either too little or too much trailer brake torque during braking. Further, as the overall brake torque (vehicle brakes and trailer brakes) needed to slow the combined vehicle and trailer varies with the speed of the combined vehicle and trailer (e.g., by requiring higher deceleration to slow over a comparable distance) and with road grade, a constant brake gain may result, for example, in excessive gain leading to wheel locking during braking from relatively lower speeds (e.g., less than 5 miles per hour). In a similar manner, similar trailer brake torque can result in lower deceleration from heavier trailers than with lighter trailers.

SUMMARY OF THE DISCLOSURE

According to one aspect of the present disclosure, a vehicle brake system includes a brake control device, a vehicle acceleration sensor, and a trailer brake controller. The trailer brake controller outputs an initial trailer brake torque demand based on an input received from the brake control device and adjusts the initial trailer brake torque demand to converge a signal from the vehicle acceleration sensor to an expected negative acceleration value correlated with the input from the brake control device.

Embodiments of this aspect can include any one or a combination of the following features:

the brake control device is a brake pedal moveable to an application position a range between a rest position and a full application position, and the input received by the controller from the brake control device is a brake application signal proportionate to the application position with respect to the range;

the controller adjusts the initial trailer brake torque demand according to a closed loop control scheme;

the closed loop control scheme is a proportional-integral-derivative control scheme;

the expected negative acceleration is a function of the brake torque demand the expected negative acceleration function is adjustable based on a user input;

the vehicle acceleration sensor is a component of a vehicle antilock brake control system;

the vehicle acceleration sensor is a module that receives an input from a vehicle velocity sensor over time to determine acceleration.

According to another aspect of the present disclosure, a vehicle includes a brake control device, an acceleration sensor, an external communication coupling, and a trailer brake controller. The trailer brake controller receives an input from the brake control device and derives an initial trailer brake torque demand based on the input, outputs the initial trailer brake torque demand to the communication coupling, and adjusts the initial trailer brake torque demand to converge a signal from the acceleration sensor to an expected negative acceleration value correlated with the input from the brake control device.

According to another aspect of the present disclosure, a trailer brake control method includes receiving an electronic input from a vehicle brake control device and deriving an initial trailer brake torque demand based on the input and outputting the initial trailer brake torque demand to a trailer brake module. The method further includes adjusting the initial trailer brake torque demand to converge a signal from a vehicle acceleration sensor to an expected negative acceleration value correlated with the input from the brake control device.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
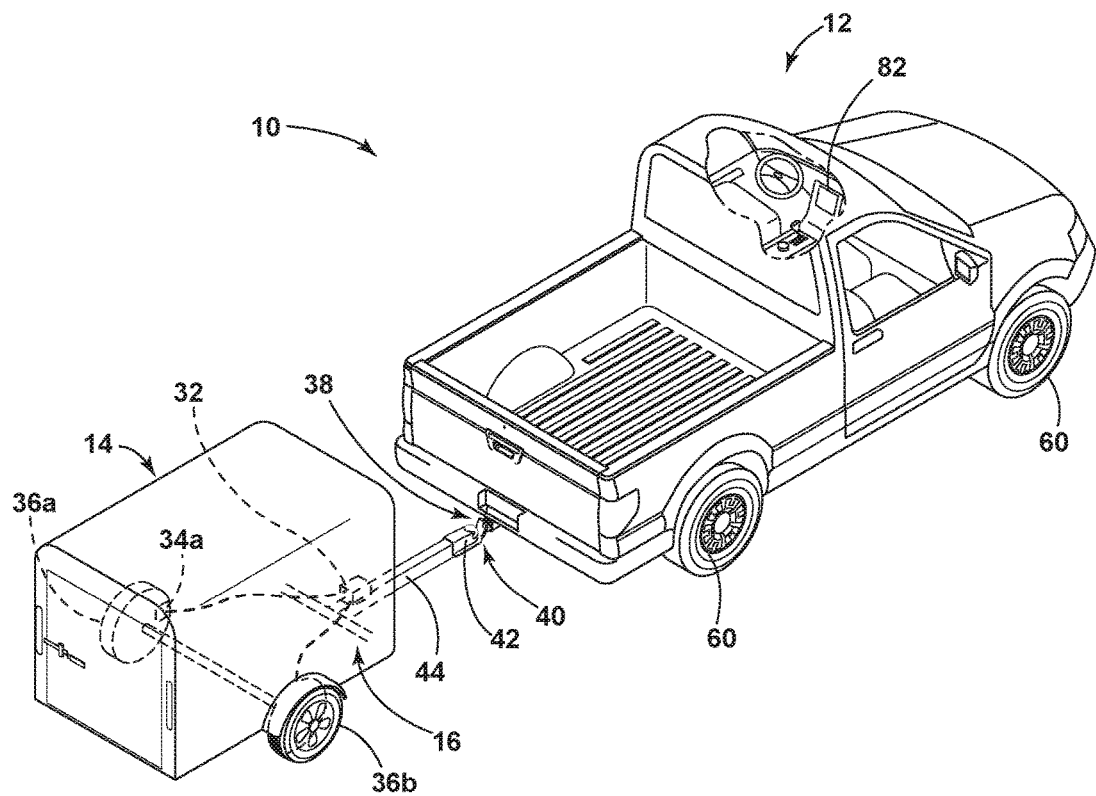
FIG. 1 is a perspective view of a vehicle coupled with a trailer and including a trailer brake control system.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-4, reference numeral 10 generally designates a system for a vehicle 12 towing a trailer 14 in controlling a trailer brake system 16. The system 10 includes a vehicle brake control device 18 (which is depicted in the figures as being a brake pedal), a vehicle acceleration sensor 20 (or other component or structure producing an acceleration signal, which may also be indicated using reference numeral 20), and a trailer brake controller 22. The trailer brake controller 22 outputs a trailer brake torque demand 24 based on an input in the form of a brake control signal 26 received from the brake control device 18 and adjusts the trailer brake torque demand 24 to converge a signal 28 from the vehicle acceleration sensor 20 to an expected negative acceleration value 30 correlated with the input 26 from the vehicle brake control device 18.

Figure 2:
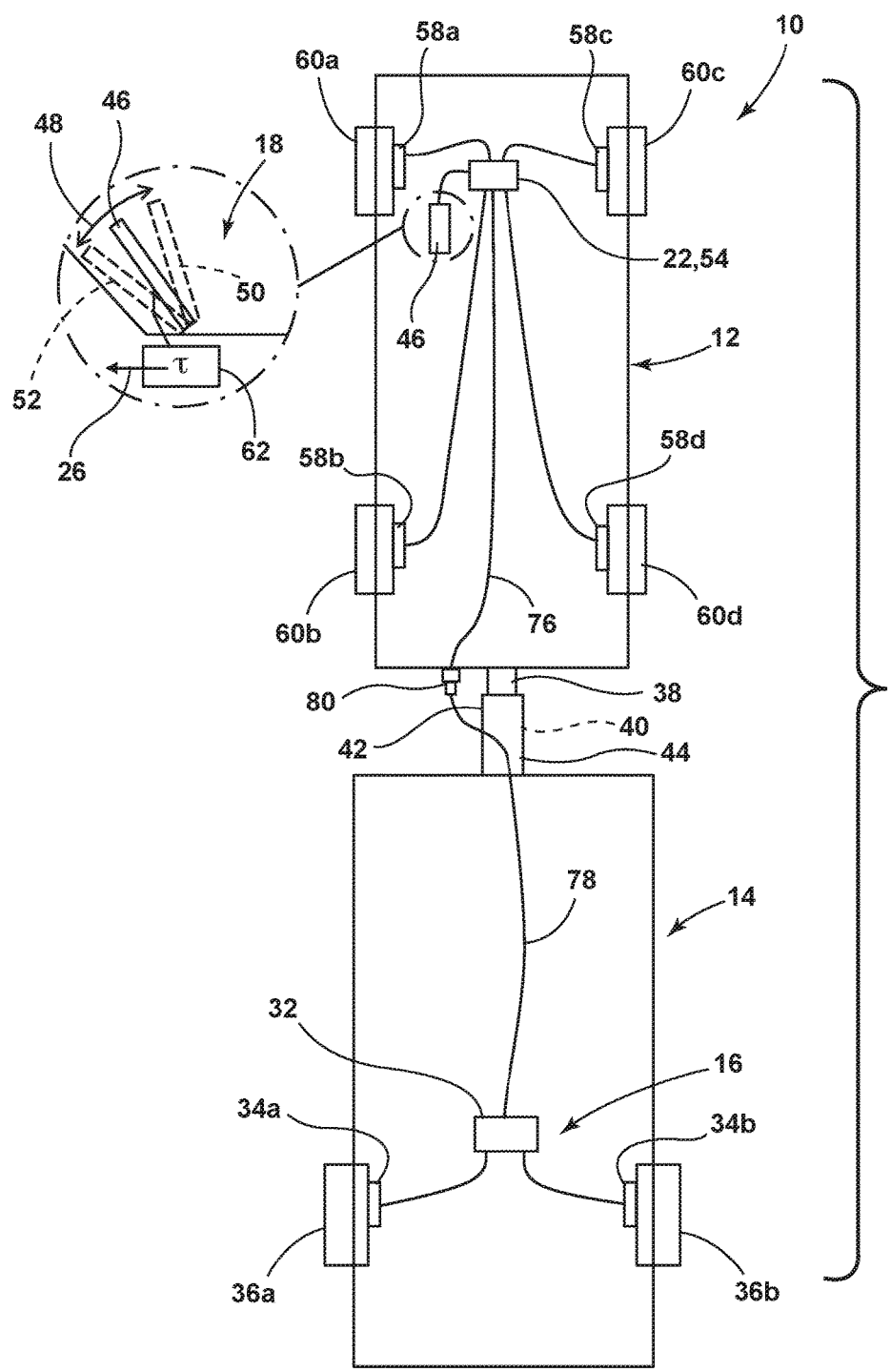
FIG. 2 is a schematic diagram of the trailer brake control system coupled with a trailer brake module for controlling the trailer brakes.

As shown in FIGS. 1 and 2, system 10 is included in vehicle 12, which is depicted as a pickup truck but can be any vehicle capable of towing trailer 14. In one example, the vehicle 12 can be a vehicle with a towing capacity great enough to tow a trailer 14 of a size and/or weight that may require its own trailer brake system 16. Such systems are generally known and, as depicted, may include a trailer brake control module 32 and individual trailer brake units 34a and 34b respectively coupled with trailer wheels 36a and 36b to selectively forcibly slow the rotation of wheels 36a and 36b in a coordinated manner with braking of vehicle 12. In this manner, the trailer brake units 34a and 34b can be in the form of disc brakes, drum brakes, or the like and can be generally similar to other known vehicle brakes. In one example, trailer brake units 34a and 34b can be electromechanically actuated such that trailer brake units 34a and 34b operate by directly receiving an electrical signal that drives an electromechanical actuator within the braking mechanism according to the voltage, for example, of the signal. Such a signal can be sent to trailer brake units 34a and 34b by trailer brake module 32, which receives trailer brake control signal 26 from trailer brake controller 22 and may simply distribute and transmit the trailer brake control signal 26 among trailer brake units 34a and 34b. In some implementations trailer brake module 32 may further process trailer brake control signal 26 such as by amplifying of otherwise calibrating trailer brake control signal 26 for actuation of trailer brake units 34a and 34b in a particular manner. Alternatively, trailer brake system 16 may omit trailer brake module 32 such that trailer brake units 34a and 34b may receive trailer brake control signal 26 directly. In a still-further alternative, trailer brake system 16 can be what is known as an electric-over-hydraulic system in which trailer brake units 34a and 34b are hydraulically-actuated brake units that are actuated by increased pressure of a hydraulic fluid supply coupled with trailer brake units 34a and 34b. In such an implementation, trailer brake module 32 can include a hydraulic pump that pressurizes brake fluid within lines connecting trailer brake module 32 with trailer brake units 34a and 34b according to the trailer brake control signal 26 that trailer brake module 32 receives from the trailer brake controller 22 of vehicle 12.

In any of the specific implementations of trailer brake system 16 described herein and otherwise known, it can be appreciated that the braking force applied to trailer wheels 36a and 36b by trailer brake units 34a and 34b is directly proportional to a characteristic, such as the voltage, of the trailer brake control signal 26. In this manner, and as discussed above, the trailer brake controller 22 can receive the torque demand signal 24 from the brake control device 18 and output trailer brake control signal 26 to trailer brake system 16 to implement a braking force using trailer brake units 34a and 34b that is commensurate with and proportionate to desired braking of vehicle 12. This allows trailer 14 itself, by way of trailer brake system 16 to compensate for the additional weight and resulting momentum of the trailer 14 and the effect thereof on the ability of the combined vehicle 12 and trailer 14 during braking. As illustrated, trailer 14 may be coupled with vehicle 12 by way of a hitch receiver 38 that is coupled with the frame of vehicle 12, hitch receiver 38 having a hitch ball 40 coupled therewith that, in turn, couples in an articulating manner with a trailer hitch 42 disposed on a tongue 44 of trailer 14. Other trailer arrangement and towing assemblies are also known and useable in connection with system 10, including a gooseneck trailer that couples with a "fifth wheel" positioned above and longitudinally and laterally aligned with a center of the rear axle of vehicle 12. Regardless of the particular coupling mechanism, this articulating coupling of vehicle 12 with trailer 14 understandably adds the weight of the trailer 14 and any payload carried by trailer 14 to the total weight that vehicle 12 must accelerate to move and decelerate (i.e. negatively accelerate), in the absence of trailer brake system 16, to slow or stop.

Figure 5:
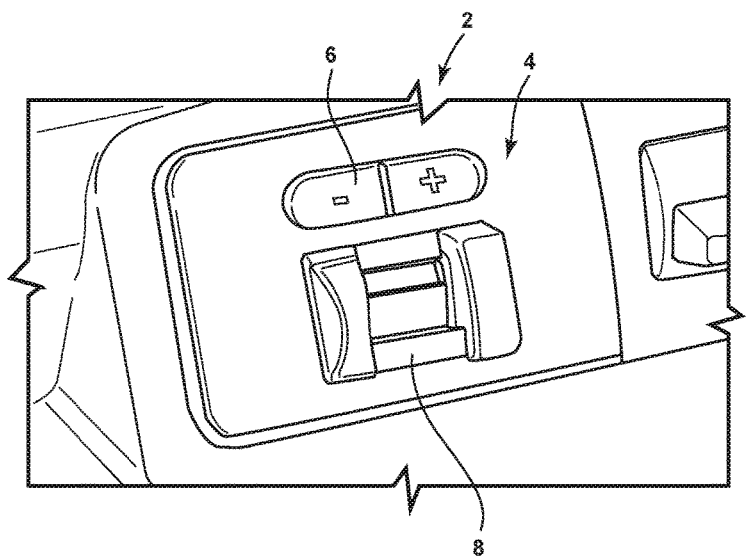
FIG. 5 is a user-control device for a related art trailer brake control system.
Figure 6:
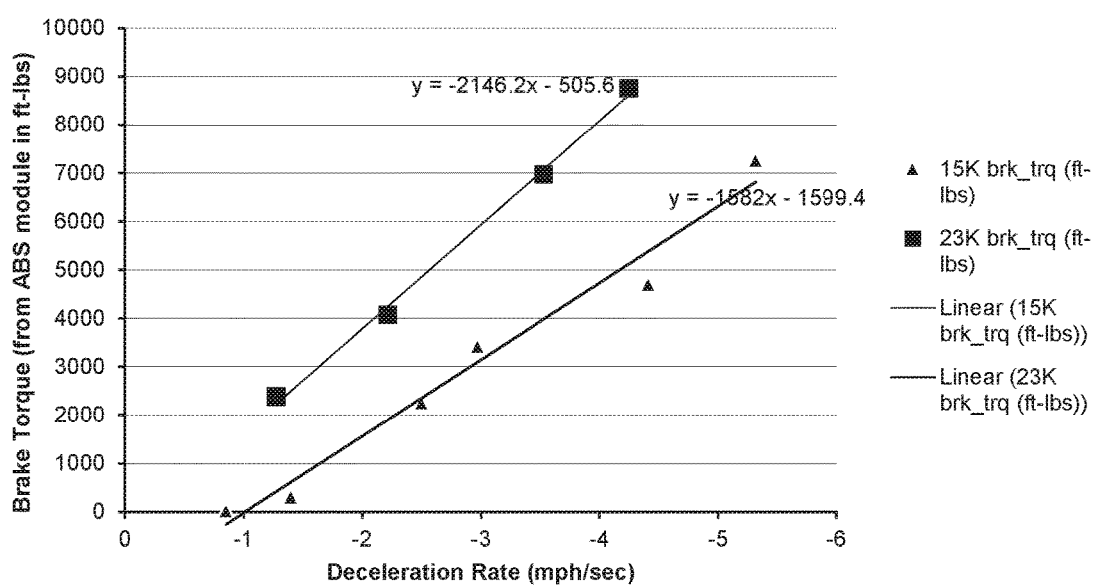
FIG. 6 is a graphical representation of system behavior of the related art trailer brake control system.

Turning to FIGS. 5 and 6, related control systems 2 have been used to control trailer brake systems 16. Such systems include the capability to receive a brake torque demand signal from a brake control device, in a similar manner to the present system 10. The related systems 2, however, provide a control signal for a coupled trailer brake system that is constantly proportional to the torque demand signal, regardless of the actual braking effect achieved by the controlled actuation of the trailer brake system. While, system 2, does provide a calibration input 6 for adjustment of a gain applied to the brake torque demand signal to achieve the output trailer brake control signal, this gain adjustment is not responsive enough for a user to adjust during extended driving over multiple speeds. Rather, such gain control is intended to be used upon a change in trailer load (either by removing payload or changing the trailer) before engaging in extended driving. As such, a test actuation input 8 is also provided that can allow the user to test the result of the trailer brake control signal output at a current gain level to determine if the resulting brake application is too low (resulting in too low a brake torque being applied) or too high (which may result in locking of the trailer wheels due to excessive brake torque). Accordingly, a user can add or remove gain using input 6 according to the test results. In some instances, a user may forget to adjust gain when needed, resulting in extended driving with either too little or too much trailer brake torque during breaking. Further, as the overall brake torque (vehicle brakes and trailer brakes) needed to slow the combined vehicle and trailer varies with the speed of the combined vehicle and trailer (e.g., by requiring higher deceleration to slow over a comparable distance) and with road grade, a constant brake gain may result, for example, in excessive gain leading to wheel locking during breaking from relatively lower speeds (e.g., less than 5 miles per hour). This behavior is illustrated in FIG. 6, wherein the vehicle brake torque (Y-axis) is plotted against the deceleration rate (X-axis) realized in testing of a vehicle including an implementation of system 2 for trailers of 15,000 lbs. and 23,000 lbs. respectively, with similar brake torque causing lower deceleration from the heavier trailer.

Accordingly, the present system 10 provides a modified control scheme where, as mentioned above, the trailer brake controller 22 adjusts the trailer brake control signal 26, as needed, to cause deceleration of the combined vehicle 12 and trailer 14 at a rate that aligns with, or is acceptably close to an "ideal" or "expected" deceleration rate. In one embodiment, the expected deceleration rate can be the rate of deceleration of the vehicle 12 alone, with no trailer 14 coupled therewith, corresponding with the brake torque demand signal 24. As shown in FIG. 2, vehicle 12 includes brake control device 18 utilizing a pedal 46 moveable within a range of positions (including the illustrated intermediate position) between a rest position 50, at which no brake force is requested (i.e. the brake torque demand signal 24 is zero), and a full application position 52, at which the maximum brake torque available through the vehicle brake system 54 is requested (i.e. the brake torque demand signal 24 is at a maximum value $\tau_{v\text{-}max}$). In this manner, the requested brake torque progresses from zero to the maximum value $\tau_{v\text{-}max}$ as pedal 46 is moved through the available range 48 of movement.

Figure 3:
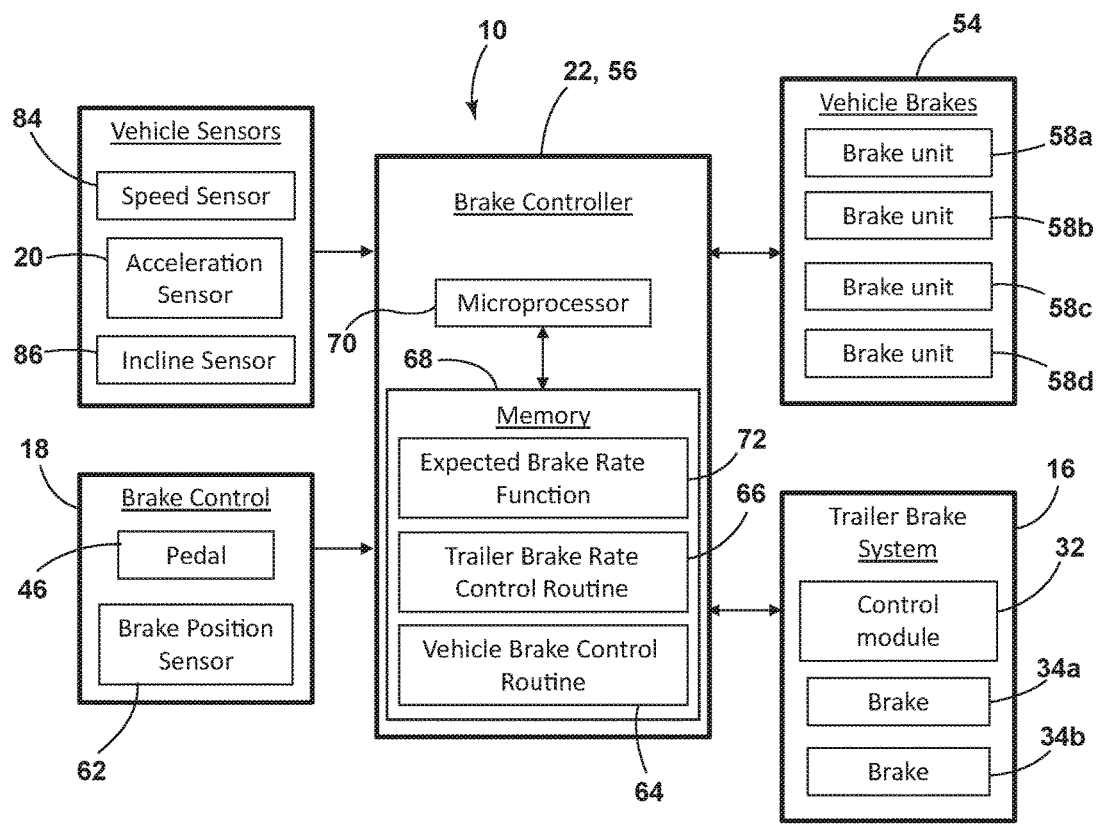
FIG. 3 is a diagram of the trailer brake control system and related vehicle and trailer components.

As shown in FIG. 3, brake pedal 46 is coupled with a vehicle brake module 56 of the vehicle brake system 54, which in turn controls the actuation of vehicle brake units 58a, 58b, 58c, and 58d, which act to slow the rotation of the individual vehicle wheels 60a, 60b, 60c, and 60d to provide negative acceleration of vehicle 12. In various examples, brake pedal 46 can directly pressurize hydraulic fluid within vehicle brake system 54 with vehicle brake module 56 distributing the pressurized fluid to cause actuation of vehicle brake units 58a, 58b, 58c, and 58d in a predetermined manner (including, for example, by causing higher pressurization in front wheels 60a and 60c). In a further example, vehicle brake module 56 may provide electromechanical assistance to augment or boost the pressure within the hydraulic fluid provided by the position of brake pedal 46 that is proportional (linear or otherwise) to the pressurization provided by the position of brake pedal 46. Still further, brake pedal 46 may be coupled with a position sensor 62 that determines the brake pedal 46 position and outputs a corresponding signal, which may be considered the brake torque demand signal 24 with a value τ corresponding with the position of brake pedal 46 within the range 48 of positions. This brake torque demand signal 24 can be electronically output to vehicle brake module 56, which can then electromechanically pressurize hydraulic fluid coupling vehicle brake module 56 with vehicle brake units 58a, 58b, 58c, and 58d. Similarly, the previously-described electromechanically-assisted variation of vehicle brake system 54 can determine the brake torque demand signal 24 and corresponding value τ based on the level of pressurization provided by the brake pedal 46 (a pressure sensor being considered herein to be position sensor 62), the particular position thereof correlating with such pressurization and being used to determine a desired level of assistance. In a standard hydraulic implementation of vehicle brake system 54, position sensor 62 can be included solely for use in connection with control of the trailer brake system 16, as described herein. In this manner, a particular input made by the driver by way of brake control device 18 through movement of pedal 46 within the proscribed range 48 of motion thereof will cause actuation of the vehicle brake units 58a, 58b, 58c, and 58d to slow vehicle 12 in a manner that is generally predictable (i.e. a certain deceleration rate for a given position of pedal 46) and consistent, absent excessive heating of or wear to components of the vehicle brake units 58a, 58b, 58c, and 58d.

Figure 7:
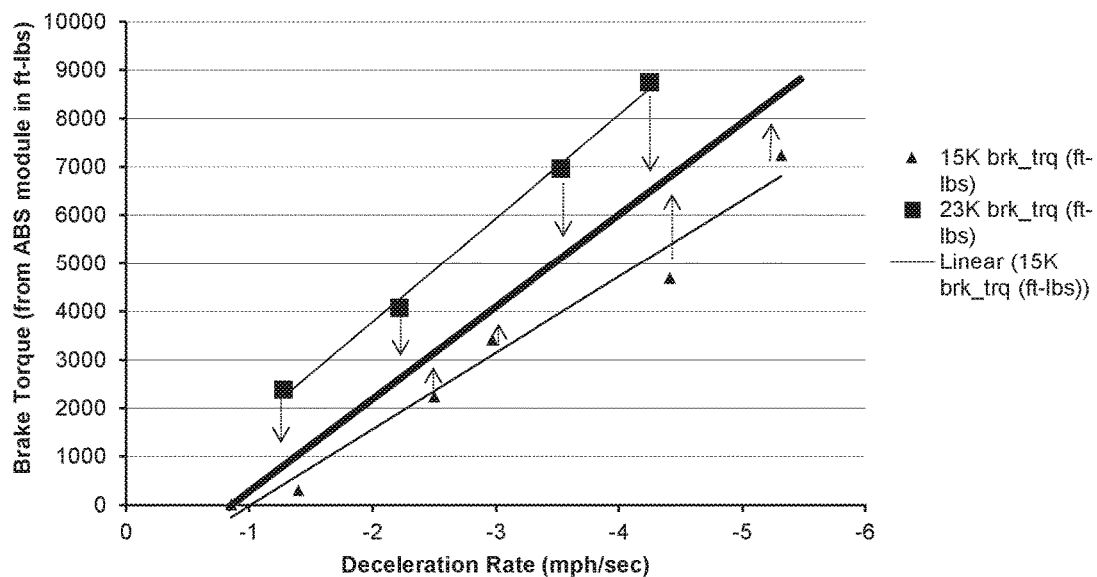
FIG. 7 is a graphical representation of system behavior of the trailer brake control system of FIGS. 3 and 4.

In an example, the input position of brake pedal 46 and the correlating expected deceleration rate can be empirically determined using a test vehicle, for example, or can be determined through computer simulations with various vehicle characteristics as inputs to the simulation. The empirical results and/or simulated data can be correlated to derive a formula correlating brake input position with expected deceleration continuously through the range of movement for brake pedal 46. In this manner, the brake input position can be considered the brake torque demand τ and can be provided as brake torque demand signal 24 with the derived formula $f(\tau)$ being used to output the expected deceleration rate (or expected negative acceleration value) 30. As shown in FIG. 7, the formula $f(\tau)$ for expected deceleration rate 30 can be generally linear or, in other examples can be exponential, polynomial, or the like, depending on the particular tuning of vehicle brake system 54. In a variation, the empirical data or simulation data can be used to populate a lookup table of particular expected deceleration rates at various points of brake pedal 46 throughout the range 48 of motion thereof at a desired resolution. In this manner, the expected deceleration value 30 can still be determined based on the brake torque demand τ signal 24 and is considered herein as being generally similar to using a formulaically-derived expected deceleration value 30.

As shown in the system diagram of FIG. 3, the above-described trailer brake controller 22 can be a component of vehicle brake module 56. In an example, vehicle brake module 56 can be an antilock brake system module and can include a vehicle brake control routine 64, which can include the particulars of the above-mentioned electronic assistance functionality and/or controls related to anti-lock functionality, among other controls and routines. Similarly, a trailer brake control routine 66 can also be included that provides the control routine used to output the trailer brake control signal 26, as discussed further below such that vehicle brake module 56 can also function as trailer brake controller 22. Both of these routines can be programmed functionality of vehicle brake module 56 stored in memory 68 and executable by a microprocessor 70 within vehicle brake module 56. Vehicle brake module 56 can also include the above-described expected function $f(\tau)$ or the above-mentioned lookup table for the expected deceleration value 30 in an additional routine 72. In an alternative embodiment, the trailer brake control routine 66 and expected deceleration routine 72 can be included in the general on-board computer system of vehicle 12. Still further, the trailer brake controller 22 can be a stand-alone component in communication with vehicle brake module 56.

Figure 4:
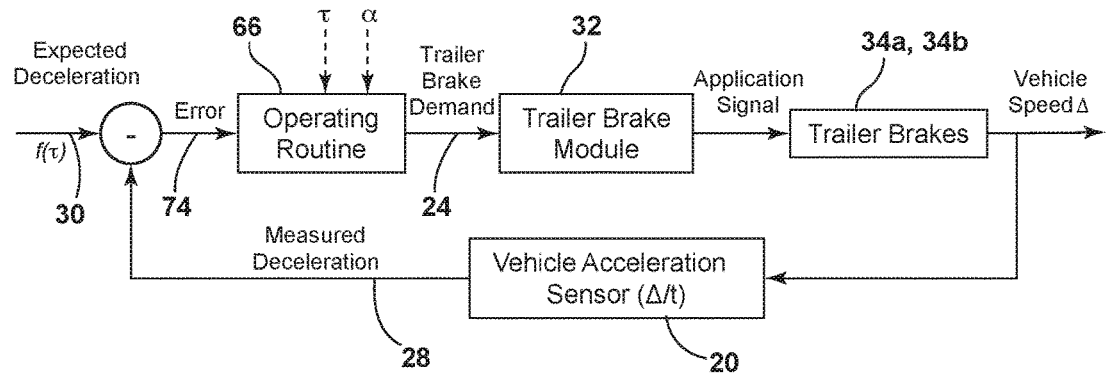
FIG. 4 is a schematic diagram of the control used by the trailer brake control system.

In this manner, vehicle brake module 56 including or otherwise incorporating trailer brake controller 22 and/or equivalent functionality therefor, can implement a closed-loop control scheme that adjusts the trailer brake control signal 26 as an output to converge an actual-measured deceleration of vehicle 12 when towing trailer 14 to the expected deceleration for a given brake pedal 46 position and the brake torque request τ associated therewith. As discussed above, the expected deceleration is based on the deceleration of the vehicle 12 alone with the corresponding brake torque request τ to the vehicle brake system 54. As shown in FIG. 4, when the driver depresses brake pedal 46 in an effort to slow the vehicle 12 and trailer 14 combination, the trailer brake controller 22 receives the expected deceleration value 30 by way of a signal that is output by the expected deceleration function 72, as discussed above, as the function $f(\tau)$ of the brake torque demand τ signal 24, received from position sensor 62 (in any of the implementations discussed above). In this manner, the brake torque request τ signal 24 is simultaneously fed to the vehicle brake control routine 64 to cause actuation of the vehicle brakes 58a, 58b, 58c, and 58d. In controlling the trailer brake system 16, trailer brake controller 22 can also receive, in the form of a signal, from acceleration sensor 20 (or other comparable component, including vehicle speed sensor 84) a measured acceleration value 28 corresponding with the instantaneous deceleration of vehicle 12 towing trailer 14 and can determine an error 74 between the measured vehicle acceleration value 28 and the expected acceleration value 30. The error 74 can then be fed into trailer brake control routine 66 to output the trailer brake control signal 26 that is proportionate to the error signal 74. As discussed above, the trailer brake control signal 26 is transmitted to trailer brake system 16, for example by way of trailer brake module 32, which sends the distributed and/or calibrated signal to trailer brakes 34a and 34b. In this manner, trailer brake routine 66 converges toward a zero value for error 74, at which point the measured deceleration value 28 has converged to the expected deceleration value 30.

In various implementations, trailer brake control routine 66 can include various gains and filtering to achieve the desired responsiveness for system 10. For example, trailer brake control routine 66 can include proportional, integral, and derivative control gains (i.e., a proportional-integral-derivative, or "PID", controller) based on the error 74 signal to control the ramp up and overshoot of trailer brake control signal 26, such gains being tuneable according to known means. Additionally, trailer brake control routine 66 can be primed with an initial gain or value that is directly proportionate to the brake torque demand τ by further taking the signal 24 as an input directly. In this manner, the initial measured deceleration value 28 may actually be greater than the expected deceleration value 30, resulting in system 10 ramping down the trailer brake control signal 26. The effects of such a system 10 are shown in the graph of FIG. 7 showing combined trailer 14 and vehicle 12 brake torque (Y-axis) plotted against the initial deceleration rate (X-axis) for trailers of 15,000 lbs. and 23,000 lbs. respectively, with similar brake torque causing actual deceleration value 28 lower than the expected deceleration value 30 for the vehicle 12 combined with the heavier trailer 14 and actual deceleration value 28 higher than the expected deceleration value 30 for the vehicle 12 combined with the lighter trailer 14. Accordingly, as illustrated, system 10 ramps up the trailer brake control signal 26 for the heaver trailer 14 and ramps down the trailer brake control signal 26 for the lighter trailer 14 to converge the actual deceleration value 28 to the expected deceleration value 30. In this manner, system 10 may be able to account for various disturbances occurring during braking, including intentional disturbances related to other systems and devices used in decelerating vehicle 12. In one example, vehicle 12 may also include functionality to initiate one or more downshifts in the vehicle transmission system to augment the braking force by the vehicle brake system 54. In such an instance, when vehicle slows beyond what may be expected based on the use of brakes 54 alone for the given brake position signal τ, the additional deceleration will be sensed by system 10, which may, for example, adjust the trailer brake application signal 24 downward accordingly.

In one embodiment, the vehicle acceleration sensor 20 is a component of a vehicle antilock brake system ("ABS"). Acceleration sensors are typically included in known ABS implementations, in which they are used to monitor vehicle movement for instances in which the brakes should be pulsed, according to typical ABS operation. The present system 10, in the described embodiment, may make use of the ABS acceleration sensor 20 in various ways. For example, as discussed above, the trailer brake controller 22 may be a component of the vehicle brake system 54, which may be the presently-described antilock brake system. In such an example, the vehicle brake system 54 may use acceleration sensor 20 for both ABS functionality and control of trailer brake system 16 in the above-described manner. In an alternative arrangement, system 10 may be based around a separate trailer brake controller 22 that operates separately from vehicle brake system 54. In such an arrangement, trailer brake controller 22 may be in communication with vehicle brake system 54 in a manner that allows it to share use of the acceleration sensor 20 of vehicle brake system 54. In a still further embodiment, trailer brake controller 22 may have its own dedicated acceleration sensor 20 or may communicate with an on-board computer within vehicle 12 that can provide vehicle velocity information, by way of a speed sensor 84 that may allow controller 22 to monitor changes in the velocity of vehicle 12 over time to calculate negative acceleration (i.e., deceleration) during braking. Other arrangements are contemplated along similar lines to those which are described herein.

Returning to FIG. 2, trailer brake controller 22 is shown as being positioned within vehicle 12, which may include positioning where the architecture of other, existing components allows and/or optimizes sensor functionality and interconnecting with other systems or components of vehicle 12 and may result in particular positioning that differs from what is depicted in the schematic view of FIG. 2. It is noted that trailer brake controller 22 can be pre-installed in vehicle 12, including by connection with the various additional vehicle components described herein, including by integration with vehicle brake controller 20, as illustrated in FIG. 3. Alternatively, trailer brake controller 22 can be an aftermarket component or unit that can be installed into vehicle 12 by mounting within vehicle 12 and connection with the vehicle components described herein, such as by connection with vehicle brake controller 20.

Trailer brake controller 22 is shown as being connected with the trailer brake module 32 of trailer 14 by way of a physical connection including an electrical line 76 within vehicle 12 and a separate electrical line 78 within trailer 14. The vehicle line segment 76 is coupled with trailer brake controller 22 to receive the trailer brake control signal 26 and extends to a communication coupling 80 positioned along the rear of vehicle 12. In various examples, communication coupling 80 may be a wiring harness mounted on a portion of the hitch receiver 38 adjacent hitch ball 40 or may be mounted within the vehicle bumper in a similar position, depending on the configuration of vehicle 12. In this manner, trailer line segment 78 may be configured to connect with communication coupling 80 to facilitate transmission of the trailer brake control signal 26 to trailer brake module 32. In an alternative arrangement, trailer brake controller 22 may include a wireless transmitter to send the trailer brake control signal 26 to a wireless receiver within trailer brake module 32, which can allow transmission of trailer brake control signal 26 to trailer brake controller 22 in a wireless manner, without the use of lines 76 and 78 or a physical connection using communication coupling 80, for example.

In a further implementation of system 10, a user may be able to make adjustments to the expected negative acceleration function, such as by adjusting any coefficients or the like using a designated input. Such an input may be similar to the gain input 6 shown in the related art example of FIG. 5, and may allow the user to make fine-tuned adjustments or the like to the expected deceleration rate and/or other aspects of the responsiveness of system 10 (including ramp-up or the like). In an alternative, such adjustment may be made by way of a menu accessible using a human-machine interface 82 (FIG. 1) within vehicle 12. Still further, system 10 may be able to account for potential high-outputs in trailer brake demand 24 αwhen towing on a negative grade. In particular, the increased force necessary to slow a vehicle 12 and trailer 14 combination when towing downhill may result in the trailer brake demand 24 based on the expected deceleration function ƒ(τ) ramping up at a rapid rate that is uncomfortable or disruptive to the driver or reaching an overall level that, for example, causes locking of the trailer wheels 36a, 36b. In such an instance, system 10 may, within operating routine 66, for example, employ a max-clip for trailer brake demand 24. This may include a static, set clip calibrated to a particular brake force or a percentage of the maximum application of trailer brake system 16 (e.g. 90% of full application). Alternatively, the max-clip could related (such as by a function or incremental relation) to the incline α of vehicle 12, as measured by incline sensor 86, for example with the incline α being fed into the operating routine 66, as shown in FIG. 4. Still further, operating routine 66 can include a rate-limiting operator to prevent system 10 from ramping up the trailer brake demand 24 too quickly, which may allow system 10 to catch up with the ideal deceleration 26 before the trailer brake demand 24 becomes too high, while also preventing a jarring initial brake effort. Such a rate limiter can, similarly, be absolute or related to the incline α of vehicle 12. As a further alternative, the ideal brake rate function 72 can additionally be a function of, or otherwise adjust for, the incline α by raising the ideal acceleration for a given brake position τ for a steeper downward incline α.

Still further, the expected deceleration signal 26 may include a deadband or may otherwise be communicated as a range of deceleration rates based on the described function ƒ(τ) or may determine the expected deceleration rate according to a range of brake positions based on the brake position signal τ. This can allow system to avoid repeated applications of trailer brake system 16 in short succession due to minor variations in, for example, the measured brake position τ. In one example the expected brake rate function 72 can set the expected bake rate to a range of deceleration rates at +/−1 mph/s based on the received brake position signal τ. Alternatively, the expected brake rate function 72 can determine the expected deceleration rate 26 based on the initial brake position signal τ for output as signal 26 but only make a corresponding adjustment to the brake position signal τ upon a change in signal τ by, for example +/−3 percent. Other ranges for the range of expected deceleration rates 26 and the required change in signal τ are contemplated according to particular system 10 configurations, requirements, and desired responsiveness.

Figure 8:
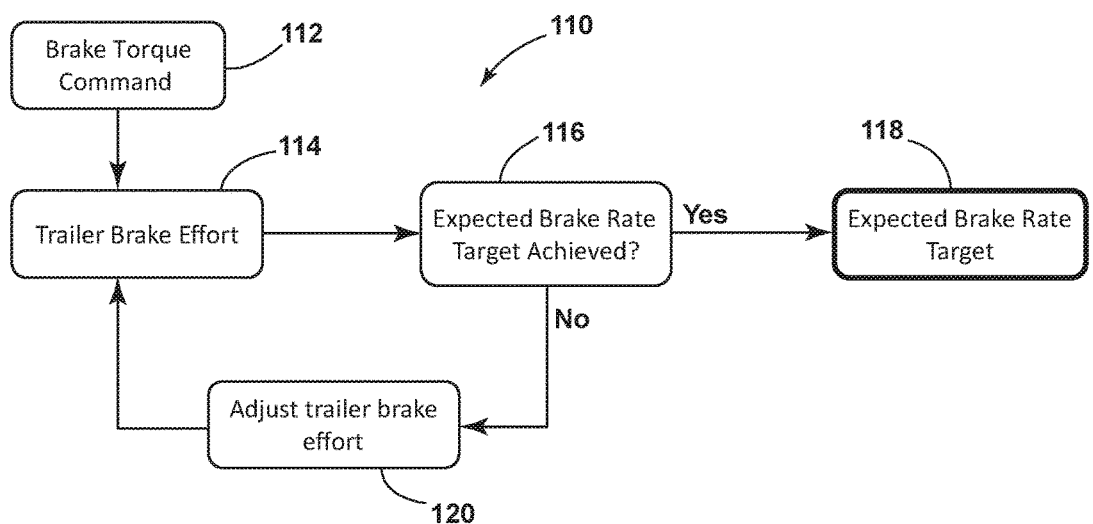
FIG. 8 is a flowchart illustrating a method implemented by the present trailer brake control system.

As illustrated in FIG. 8, a method 110 according to an embodiment implements control functionality as described above with respect to FIG. 4 using the system of FIGS. 2 and 3. In particular, the method 110 includes, in step 112 receiving an electronic input from a vehicle brake control device 18 in the form of vehicle brake torque demand signal 24. An initial trailer brake torque demand 24 is determined based on the input torque demand signal 24 in the form of a trailer brake control signal 26. The trailer brake control signal 26 is then output in step 114 to trailer brake module 32 with actuates associated trailer brakes 34a and 34b according to the trailer brake control signal 26, resulting in trailer brake effort to slow the combined vehicle 12 and trailer 14. The method 110 further includes adjusting the initial trailer brake torque demand 24 to converge the signal 28 from vehicle acceleration sensor 20 to the above-described expected negative acceleration value 30 correlated with the torque demand signal 24 from the brake control device 18. In particular, in step 116, the method 110 includes determining, using acceleration sensor 20, whether the actual deceleration rate of vehicle 12 matches the expected deceleration value 30, which is determined, as discussed above, as a function of the brake torque demand 24. If the actual deceleration value 28 matches the expected deceleration value 30, then the present trailer brake torque demand signal 24 is maintained in step 118. If the actual deceleration rate 28 is different from the expected deceleration value 30, the trailer brake torque demand signal 24 is adjusted, up or down depending on the sign of the associated error signal 74 (FIG. 4), in step 120. The change in the trailer brake torque signal 24, results in a change in the trailer brake effort achieved in step 114, which is continuously monitored in the closed loop depicted in FIG. 8 until the expected brake rate target is achieved, at which point the derived trailer brake torque signal 24 is maintained, at least until a change is made in the brake torque demand 24.

As discussed above, the initial trailer brake torque demand 24 may be zero, the control scheme shown in FIG. 4 resulting in a ramp-up of the trailer brake control signal 26 from zero, according to the gains of controller 22 to achieve a trailer brake control signal 26 that achieves the expected deceleration value 30. In the alternative also described above, the trailer brake control signal 26 may be set to a different initial value or may be initially derived according to other means, such as an additional function fed into controller 22 to reduce the need to ramp up the trailer brake control signal 26, thereby reducing the amount of delay in actuating trailer brakes 34a and 34b.

As further, discussed above, the vehicle brake control device 18 may include brake pedal 46, which is moveable to an application position in the above-described range between rest position 50 and full application position 52. Accordingly, the brake torque demand signal 24 may be proportionate to the application position with respect to the range. In this manner, method 110 may further include actuating the plurality of vehicle brake units 58a, 58b, 58c, and 58d at a predetermined level correlating with the application position of the brake pedal 46 (i.e. brake torque demand signal 24). Further, the expected negative acceleration value 30 may be the above-described function of the brake torque demand signal 24.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle brake system, comprising:
   a vehicle brake pedal;
   a position sensor coupled with the vehicle brake pedal, measuring a position of the vehicle brake pedal within a range of movement thereof, and outputting a signal corresponding with the position of the vehicle brake pedal;
   a vehicle acceleration sensor outputting a vehicle acceleration signal; and
   a trailer brake controller:
   connected with the position sensor and the vehicle acceleration sensor;
   outputting an initial trailer brake torque demand signal readable by an external electronic brake unit correlated with the signal from the position sensor;
   determining an expected negative acceleration value correlated with the signal from the position sensor using one of a predetermined formula or a table;
   receiving a vehicle acceleration signal from the acceleration sensor; and
   adjusting the initial trailer brake torque demand signal to converge the vehicle acceleration signal to the expected negative acceleration value.

2. The brake system of claim 1, wherein the signal output by the position sensor is proportionate to the position of the vehicle brake pedal with respect to the range of movement.

3. The brake system of claim 1, wherein the controller adjusts the initial trailer brake torque demand according to a closed loop control scheme to one of increase or decrease a trailer brake torque demand corresponding with the signal.

4. The brake system of claim 3, wherein the closed loop control scheme is a proportional-integral-derivative control scheme.

5. The brake system of claim 1, wherein the predetermined formula provides the expected negative acceleration value as a function of the signal from the position sensor.

6. The brake system of claim 5, wherein the expected negative acceleration function is adjustable based on a user input as an additional variable in the predetermined formula.

7. The brake system of claim 1, wherein the vehicle acceleration sensor is a component of a vehicle antilock brake control system.

8. The brake system of claim 1, wherein the vehicle acceleration sensor is a module that receives an input from a vehicle velocity sensor over time to determine acceleration.

9. A vehicle, comprising:
   a vehicle brake pedal;
   a position sensor coupled with the vehicle brake pedal, measuring a position of the vehicle brake pedal within a range of movement thereof, and outputting a signal corresponding with the position of the vehicle brake pedal;
   a vehicle acceleration sensor outputting a vehicle acceleration signal;
   an external communication coupling; and
   a trailer brake controller:
   connected with the position sensor and the vehicle acceleration sensor;
   receiving the signal from the position sensor and deriving an initial trailer brake torque demand signal correlated with the signal from the position sensor, the initial trailer brake torque demand signal being readable by an external electronic brake unit;
   outputting the initial trailer brake torque demand signal to the communication coupling;
   determining an expected negative acceleration value correlated with the signal from the position sensor using one of a predetermined formula or a table; and
   adjusting the initial trailer brake torque demand signal to converge a signal from the acceleration sensor to the expected negative acceleration value.

10. The vehicle of claim 9, further including a hitch receiver coupled with the vehicle, wherein:
    the external communication coupling is a wiring harness one of on or adjacent the hitch receiver.

11. The vehicle of claim 9, wherein the external communication coupling is a wireless transmitter.

12. The vehicle of claim 9, wherein the signal output by the position sensor is proportionate to the position of the vehicle brake pedal with respect to the range of movement.

13. The vehicle of claim 12, wherein:
the trailer brake controller is included in a vehicle brake system that further includes a plurality of vehicle brake units; and
the vehicle brake system causes actuation of the plurality of vehicle brake units at a predetermined level correlating with the position of the brake pedal.

14. The vehicle of claim 9, wherein the controller adjusts the initial trailer brake torque demand according to a closed loop control scheme.

15. The vehicle of claim 9, wherein the predetermined formula provides the expected negative acceleration value as a function of the signal from the position sensor.

16. A trailer brake control method, comprising:
receiving a position signal from a position sensor indicating a position of a vehicle brake pedal and deriving an initial trailer brake torque demand signal correlated with the position signal;
outputting the initial trailer brake torque demand signal to a trailer brake module;
determining an expected negative acceleration value for the vehicle correlated with the position signal from the position sensor using one of a predetermined formula or a table;
receiving a vehicle acceleration signal from a vehicle acceleration sensor; and
adjusting the initial trailer brake torque demand signal to converge the vehicle acceleration signal to the expected negative acceleration value.

17. The method of claim 16, wherein the position signal from the position sensor is proportionate to the position of the brake pedal with respect to the range.

18. The method of claim 17, wherein:
the trailer brake controller is included in a vehicle brake system that further includes a plurality of vehicle brake units; and
outputting the initial brake torque demand signal causes the plurality of vehicle brake units to actuate at a predetermined level correlating with the application position of the brake pedal.

19. The method of claim 16, wherein adjusting the initial trailer brake torque demand is implemented according to a closed loop control scheme.

20. The method of claim 16, wherein the predetermined formula provides the expected negative acceleration value as a function of the position signal from the position sensor.

* * * * *